(12) United States Patent
Schweickert et al.

(10) Patent No.: US 6,487,260 B1
(45) Date of Patent: Nov. 26, 2002

(54) METHOD AND APPARATUS FOR EFFICIENT CORRELATION DETECTION

(75) Inventors: Robert K. Schweickert, Jupiter, FL (US); Mahibur Rahman, Lake Worth, FL (US); Christopher T. Thomas, Fort Lauderdale, FL (US); Clinton C Powell, II, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/285,977

(22) Filed: Apr. 5, 1999

(51) Int. Cl.$^7$ ............................................... H04L 27/06
(52) U.S. Cl. ........................................ 375/343; 375/334
(58) Field of Search ................................ 375/341, 334, 375/272, 343, 262

(56) References Cited

U.S. PATENT DOCUMENTS

| | | | | |
|---|---|---|---|---|
| 5,287,299 A | * | 2/1994 | Lin ............................. | 708/303 |
| 5,862,068 A | * | 1/1999 | Onodera ....................... | 708/605 |
| 6,263,014 B1 | * | 7/2001 | Chang et al. ................ | 370/232 |

OTHER PUBLICATIONS

Chen, Koo and Wilson, A Simplified Signed Power-s-of-Two Conversion for Multiplierless Adaptive Filters, IEEE, 1996 pp. 364–367.
Benvenuto, Franks, and Hill, Dynamic Programming Methods for Designing FIR Filters Using Coefficients −1,0, and +1, IEEE, vol. ASSP–34, No. 4, Aug. 1986, pp. 785–792.
Osborne and Luntz, Coherent and Noncoherent Detection of CPFSK, IEEE, vol. Com–22, No. 8, Aug. 1974, pp. 1023–1036.

* cited by examiner

*Primary Examiner*—Stephen Chin
*Assistant Examiner*—Kevin Kim
(74) *Attorney, Agent, or Firm*—Randi L. Dulaney

(57) ABSTRACT

A full serial implementation of a M-level correlation based demodulator (100) includes a two's complement, pass-through, zero-out complex conjugate multiplier element (102), a boxcar filter (104) coupled to the multiplier element, a complex magnitude approximater element (106) coupled to the boxcar filter and a maximum value and index holding element (108). The multiplier element reuses common products along an M-level of cross-correlation to reduce multiplication functions at a rate 2 times M faster than a sampling rate at an input of the demodulator.

21 Claims, 4 Drawing Sheets

METHOD AND APPARATUS FOR EFFICIENT CORRELATION DETECTION

FIELD OF THE INVENTION

The present invention is directed to a communication device, such as a selective call receiver, and more particularly to an efficient communication device and method of correlation detection using a low cost and low power hardware architecture.

BACKGROUND OF THE INVENTION

The Maximum Likelihood Detector which is also known as the Optimum Noncoherent Detector (or correlation detector) for detecting FSK signals in an additive white gaussian noise channel is well known. The performance of a correlation detector can also be achieved with other detector architectures such as a Matched Filter or a Fast Fourier Transform (FFT). However, use of these detectors to achieve a significant sensitivity improvement (i.e., 4 dB) over that of discriminators for 4-level orthogonal signaling (i.e. FLEX™) and a significant sensitivity improvement (i.e., 3 dB) for 4-level quasi-orthogonal signaling (i.e. ReFLEX™) depends greatly on the hardware implementation to allow for the practical realization of the specific architecture. The reasons for this is that performing such functions in hardware can become quite complex, costly, and power consuming involving many multiplication and squaring functions. Thus, what is needed is a new correlation detector scheme that can achieve up to 4 dB of sensitivity improvement for 4-level orthogonal signaling for FLEX™ (for example) and up to 3 dB of sensitivity improvement for quasi-orthogonal signaling for ReFLEX® (for example) over discriminator based detectors using low cost and low power solutions. Ideally, the new correlation detector scheme can also be applied to MSK signaling used in GSM.

DESCRIPTION OF A PREFERRED EMBODIMENT

Figure 1:
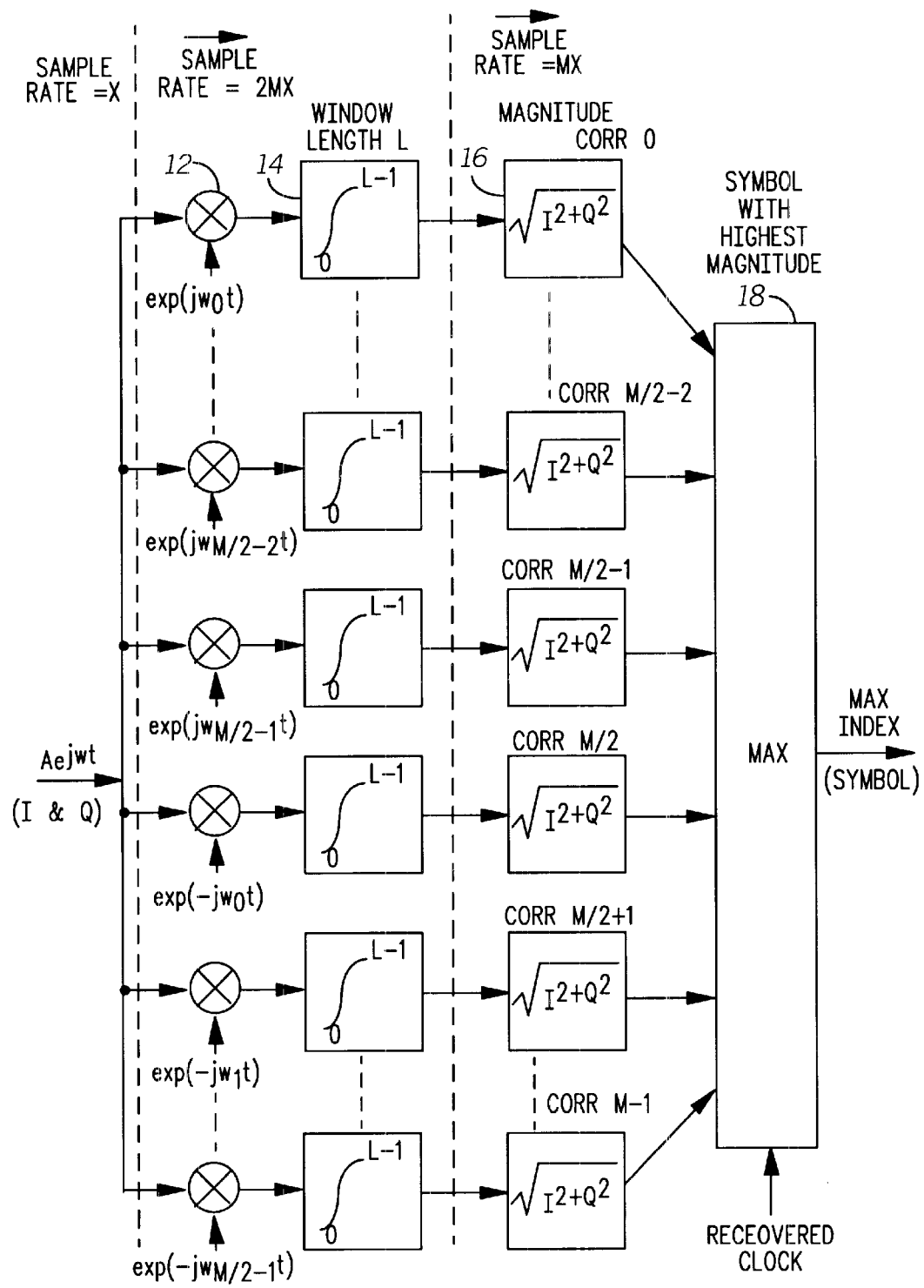
FIG. 1 is a block diagram of a correlator based demodulator for M-level FSK signaling for M>1.

FIG. 1 shows a block diagram of a correlator based demodulator 10 for M-level FSK signaling (M>1). The complex baseband signal (I & Q) is cross-correlated to M apriori known FSK signals. This is achieved by multiplying the received complex signal by the complex conjugates of the apriori known (or expected) signals at multipliers (12) and then integrating (or averaging) over a symbol period using a series of integrators 14. Next, the symbol corresponding to the correlator ($CORR\_i, i<M$) with the maximum energy (or magnitude), detected over the specified period, is chosen as the decoded symbol from among a series of correlators 16. Ideally, the desired symbol decision point, is where the cross-correlation energy (or magnitude) is at its peak. An article entitled *Coherent and Noncoherent Detection of CPFSK*, by William P. Osborne and Michael B. Luntz, IEEE Transactions on Communications, Vol. COM-22, No. 8, August 1974, pp. 1023–1036 herein incorporated by reference provides further details on the theory of operation of the specified correlator based detector for M-level CPFSK signaling.

Figure 2:
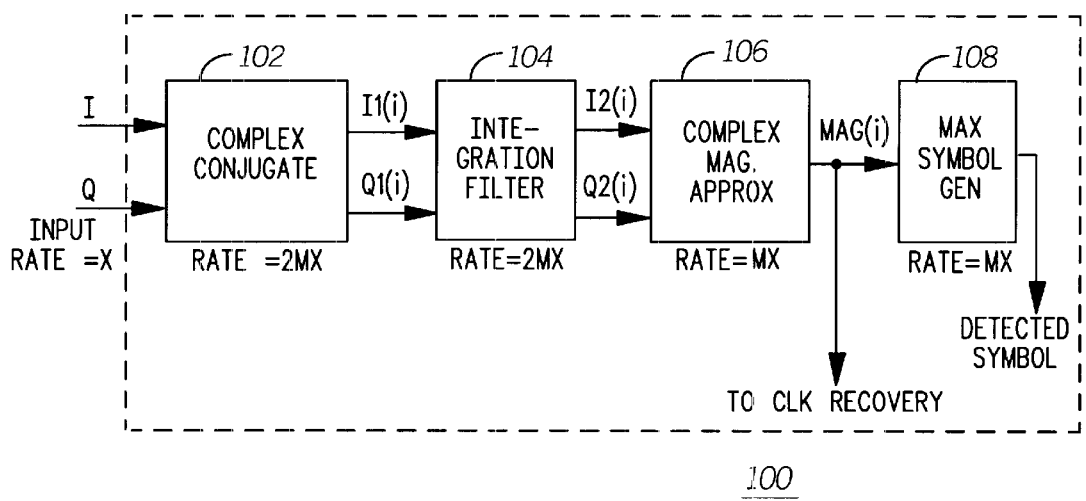
FIG. 2 is a block diagram of a serial architecture for a correlation based demodulator in accordance with the present invention.

The present invention preferably provides for a practical "multiplierless" implementation of a low cost and low power hardware architecture for an M-level correlation based FSK demodulator equivalent to what is shown in FIG. 1. In the present invention, the reference to "multiplierless" essentially refers to the fact that the complex conjugate computations can be broken down into simple negation, zero, and pass through and the complex magnitude calculations can be broken down into shift and add/subtract operations. The parallel architecture shown in FIG. 1 can be implemented more cost efficiently in dedicated hardware by performing the computations in each of the correlator paths (or branches) in a serial manner. This is delineated in FIG. 2. As each pair of samples of I and Q arrive at the demodulator input of the demodulator 100, they must be first multiplied by the complex conjugate of an apriori known signal, $\exp(jwkt)$ where k<M. This function is performed by a complex conjugate multiplier element 102. The result must then be integrated over a desired integration window L, preferably using an integration filter 104 in the form of a boxcar filter coupled to the multiplier element. Next, the magnitude (or energy) of the specified correlator path must be computed so that it can be compared to the magnitudes from the other correlation paths, preferably achieved using a complex magnitude approximater element 106 coupled to the boxcar filter. The symbol corresponding to the correlation path with the highest magnitude over the indicated integration window is chosen as the detected symbol by a symbol generator element 108 or a maximum value and index holding element.

Although FIG. 1 shows a parallel implementation which can be very costly, the present invention is primarily directed to a serial architecture for a correlation based demodulator. The demodulator 100 of FIG. 2, essentially comprises a complex conjugate multiplier element 102, an integration filter 104, a complex magnitude approximater element 106 and a symbol generator 108 arranged and constructed in a serial fashion as shown. Preferably, the multiplier element comprises hardware that reuses common products along an M-level of cross-correlation to reduce multiplication functions at a rate 2×M times faster than a sampling rate ("X") found at the demodulator input. If the sampling rate at the input of the demodulator 100 is X, then the conjugate multiplier element 102 and the integration filter 104 operate on the I and Q signals independently for the M correlators at a rate of 2MX for the M correlators. The complex magnitude approximater element 106 and the symbol generator 108 both operate at a sampling rate of MX on the I and Q signal paths simultaneously to provide a single output from each of the respective elements. Additionally, the boxcar filter used preferably integrates the results from the multiplier element over an L sample period by first differentiating and then integrating while the complex magnitude approximater element obtains an approximation of the complex magnitude at the boxcar filter output without using multiplier or square root elements. The symbol generator preferably uses a series of complex magnitude approximation outputs to generate symbols from two registers as will be more further detailed below.

The theory behind a simple low cost and low complexity complex conjugate to multiplier element 102 assumes no phase error relative to the apriori known signal and no I-Q magnitude/phase quadrature imbalance. Thus, the demodulator input signal may be represented mathematically as:

$$\text{input} = \cos(w_{in}t) + j\sin(w_{in}t)$$

where "$w_{in}$" indicates the deviation of the incoming signal. When performing a cross-correlation of this signal to that of an apriori known signal, it needs to be multiplied by the complex conjugate of such an apriori known signal. The following is the complex conjugate multiplication by such an apriori signal with deviation of "$+w_k$":

$$\text{correlation\_out} = (\cos(w_{in}t) + j\sin(w_{in}t))^*(\cos(w_kt) - j\sin(w_kt))$$

Simplifying this equation leads to the following in-phase and quadrature components that needs to be computed to correlate to a "$+w_k$" frequency deviation:

$$I1_k = \cos(w_{in}t)\cos(w_kt) + \sin(w_{in}t)\sin(w_kt)$$

$$Q1_k = \sin(w_{in}t)\cos(w_kt) + \cos(w_{in}t)\sin(w_kt)$$

In a similar fashion, it can also be derived that to cross-correlate to a "$-w_k$" deviation signal, the following in-phase and quadrature components must also be computed:

$$I1_{-k} = \cos(w_{in}t)\cos(w_kt) - \sin(w_{in}t)\sin(w_kt)$$

$$Q1_{-k} = \sin(w_{in}t)\cos(w_kt) + \cos(w_{in}t)\sin(w_kt)$$

It can be seen that to correlate to the "$+w_k$" and "$-w_k$" frequency deviation signals, only 4 multiplications need be performed instead of 8 multiplications due to the commonality of the trigonometric terms. Thus, the hardware implementation of the cross-correlation operation takes advantage of this trigonometric optimization to minimize its cost and current drain by reducing the total number of multiplications by a factor of 2. In addition, tests have shown that for FSK signaling such as that in FLEX/REFLEX, there is hardly any sensitivity degradation (<0.1 dB) when the apriori known signal, $\sin(w_kt)$ and $\cos(w_kt)$, is represented simply by 2 bits (+1, 0, −1) when the minimum signal-to-noise ratio required to achieve a desired performance goal by a correlator based detector is available at the demodulator inputs. Also, we have observed no simulcast or fading performance degradation when using such a 2-bit wide apriori known signal.

Figure 3:
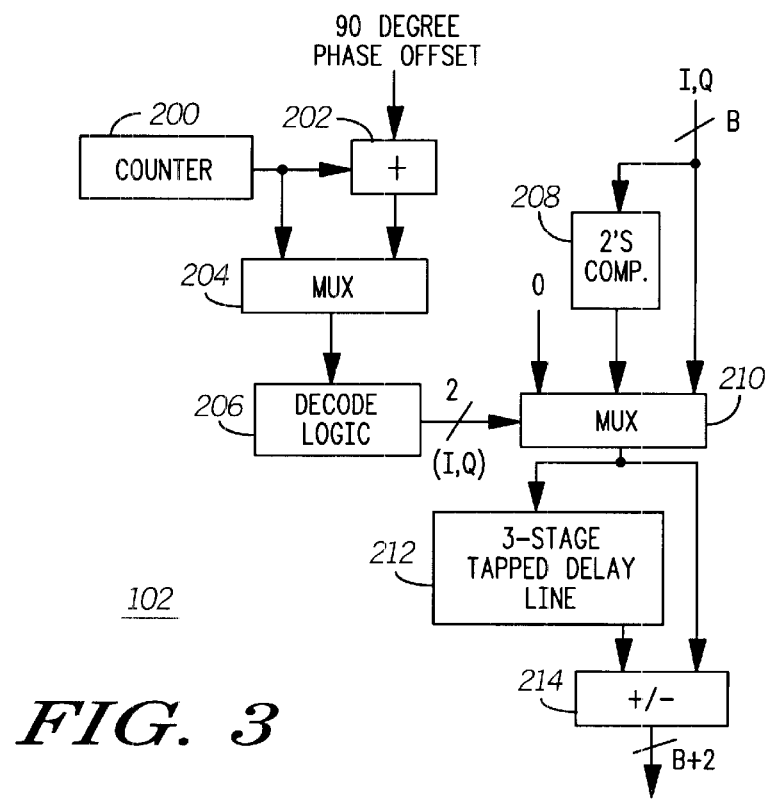
FIG. 3 is a block diagram illustrating a hardware architecture for complex conjugate multiplications in accordance with the present invention.

FIG. 3 further delineates the hardware architecture for the complex conjugate multiplier element 102 discussed. It should be noted that the present invention including the complex conjugate multiplier element is preferably implemented as a "multiplierless" demodulator. No multiplication functions are required, even for the complex conjugate multiplier element. The output of a simple counter is decoded to generate the 2-bit wide $\sin(w_kt)$ (or $Q_k$) term. In addition, a 90 degree phase offset constant term is added to the counter output to generate the 2-bit wide $\cos(w_kt)$ (or $I_k$) using the same decoding logic. If more than 2 bits of resolution were used, a more costly and power consuming ROM would be required to generate the indicated in-phase and quadrature apriori terms because of the inherent non-linearity of these terms. Another advantage of simply using 2-bit wide apriori known signals is shown in FIG. 3 by obviating the need for costly and power hungry multibit multipliers. Multiplication of the B-bit wide I and Q demodulator inputs by the 2-bit wide apriori signal (1,0, −1) is achieved by simply performing either a pass through operation (i.e., multiply by 1), take the two's complement of the input signal (i.e., multiply by −1), or zero out the input (i.e., multiply by 0). Thus, the complex conjugate multiplier element 102 is preferably a two's complement, pass-through, zero-out complex conjugate multiplier element. The equations above for $I1_k$, $Q1_k$, $I1_{-k}$, and $Q1_{-k}$ show that only 4 multiplications are needed, results of which, are either added or subtracted appropriately. This is taken into account by the 3-stage tapped delay line 212 illustrated in FIG. 3. The first three iterations through the datapath from the input to the MUX output (see FIG. 3) can generate 3 of the 4 desired multiplication results. If these results are stored in the 3-stage tapped delay line 212, successive iterations need only compute the fourth multiplication result & then either add or subtract from one of the three previously computed multiplication results stored in the specified tapped delay line to evaluate $I1_k$, $Q1_k$, $I1_{-k}$, and $Q1_{-k}$. The 3 stage tapped delay line and multiplexer help to reduce the current drain by reducing the number of cycles required for the plus and minus frequency shift keying (FSK) deviation operations of the complex conjugate multiplier element.

Figure 4:
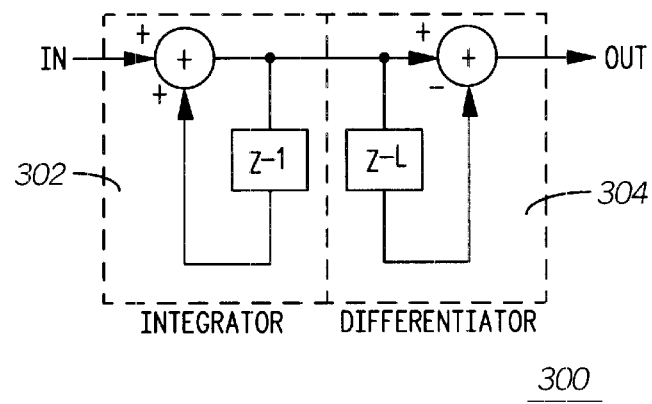
FIG. 4 is an integration filter in the form of a functional diagram for a boxcar filter in accordance with the present invention.

The complex conjugate multiplication results (I1, Q1) must next be integrated over an L-sample period. An L-sample wide rectangular window filter (or boxcar filter of length L) is preferably used to integrate over the last L samples and then dump the result. This type of filter was observed to be the most efficient considering receiver performance under different RF conditions, cost, and current drain. A functional diagram of a boxcar filter 300 shown in FIG. 4 of length L is typically described as a digital integrator 302 followed by a differentiator 304 of length L. The latter simply subtracts out the integration result from L samples ago to implement a rectangular window of length L.

Figure 5:
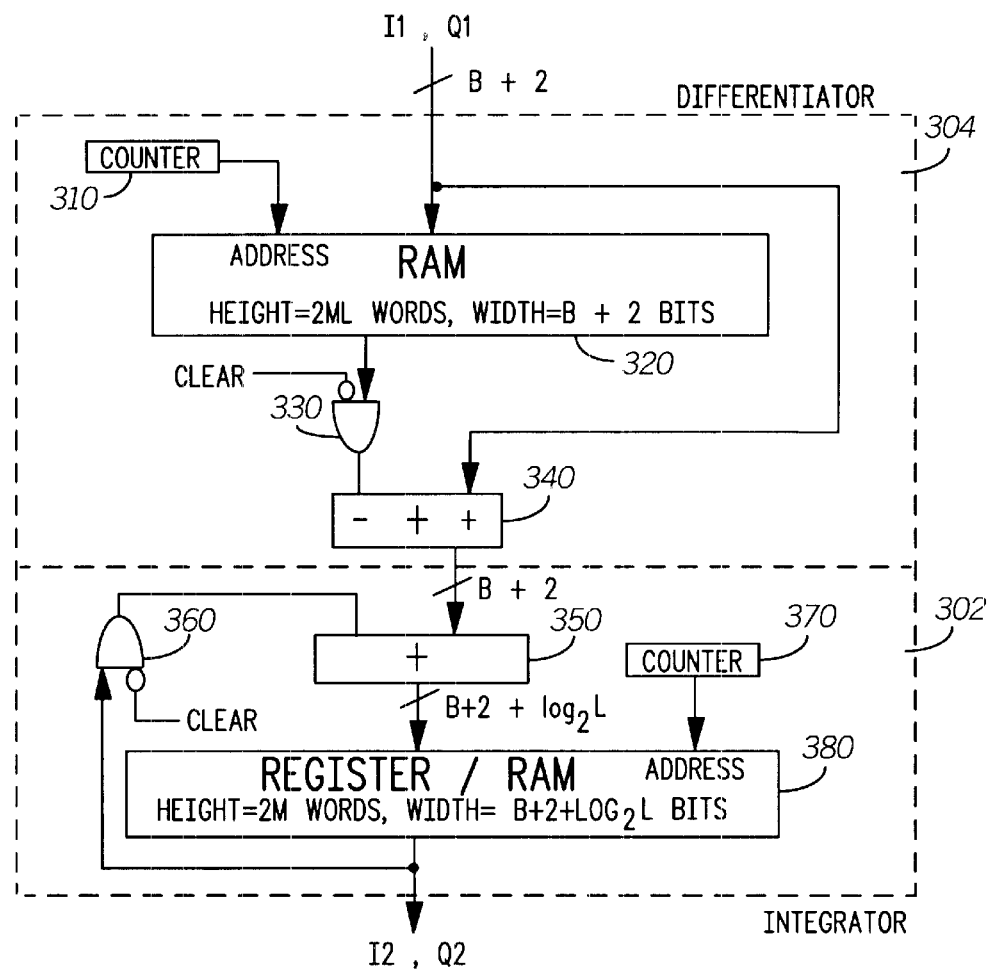
FIG. 5 is a block diagram of a boxcar filter in accordance with the present invention.

Referring to FIG. 5, the hardware architecture for the length L boxcar filter 104 preferably used in conjunction with the present invention is shown. The boxcar filter preferably receives an input at a differentiator and provides an output at an integrator. The differentiator 304 preferably comprises a counter 310 and a random access memory 320 having a height of 2×M×L words and a width of B+2 bits, wherein M represents the number of FM levels, L represents the correlator integration window length, and B represent the number of bits originally received by the demodulator. The integrator 302 preferably comprises a counter 370 and a random access memory 380 having a height of 2×M words and a width of B+2 bits+$\log_2 L$ bits. To support the largest possible values in a boxcar filter of length L, the integrator must support input bit width growth of $\log_2 L$ bits inside it. In other words, the internal bit width of the integrator must be $\log_2 L$ bits larger than its input bit width. However, in a traditional "integrator followed by a differentiator" boxcar filter, this causes the differentiator bit width to also be $\log_2 L$ bits larger. The latter is very undesirable from a cost and current drain perspective because it means that the differentiator needs to provide additional storage space for "2×M× L×log2L" extra bits. The reasons for this include a "2×M" factor which is the number of words of storage space needed for "2×M" differentiators to support M-level FSK demodulation (×M) for both the I and Q channels (×2). Also, the factor L (i.e.,×L) is included because the differentiators need to have an L-sample deep memory to be able to perform a length L differentiation using data from L samples ago on a running sample by sample basis. Finally, the factor "$\log_2 L$" ($\times \log_2 L$) is the bit width growth that would otherwise be needed if the positions of the integrator and differentiator were not swapped. For these reasons, the differentiators 304 were placed in front of the integrators 302 to minimize cost and power drain. By using this trick, the differentiators 304 need only be the same bit width of the incoming I1 and Q1 data and allow the bit width growth to only occur in the latter integrator 302. To re-iterate this point, the savings of this scheme is "$2 \times M \times L \times \log_2 L$" bits of storage space which is significant from both a cost as well as a current drain perspective. As an example, for 4-level FLEX/REFLEX paging applications using a practical integration window length as well as an oversampling ratio of 15, the savings is 480 bits of storage space. Another optimization in the boxcar filter 104 includes the use of a RAM (Read-Access-Memory) (320) as opposed to using more costly and more power hungry flip-flops/latches to provide all the storage needs for the "$2 \times M$" differentiators. As each sample of I1 and Q1 (from the complex conjugate multiplication unit) are presented to the differentiator unit 304, each sample is stored in a sequential fashion in the RAM. As this is performed on a cycle by cycle basis, previous contents of these RAM locations are read out during the same cycle to perform the length L differentiation for the operand supplied in that cycle. This makes the address control for the RAM to be quite simple leading to further reductions in cost and power. In particular, a simple counter 310 is used for this functionality as opposed to having to use twice the number of cycles because the read and write pointers have distinctly elaborate access mechanisms.

The integrator hardware architecture (302) is also shown in FIG. 5. Note that a bit width growth of $\log_2 L$ bits with respect to the input bit width is necessary in the integrators to support the largest values in a length L boxcar filter. The number of words of storage in the integrator 302 need only be "$2 \times M$" deep since it only needs to store the results from 1 sample ago for both the I and the Q channels of the M correlators. This storage may be performed using either discrete registers or a custom RAM 380 depending upon the actual number of bits of storage needed (i.e., the actual size of "$2 \times M \times (B+2+\log 2L)$" bits). Similar to the differentiator memory, sequential addressing is also employed in the integrator to allow for simple counter based read/write addressing of the latter using the counter 370.

A clearing scheme is provided for both the differentiators and integrators using gates 330 and 360 respectively. These gates allow for the desired functionality in the boxcar filter when the order of the integrator and differentiator is swapped as herein. Preferably, these gates serve as clearing elements at an output of a random access memory to allow for dynamic switching of a window length L. It is also desirable to clear both these units at periodic warm-up states as a fail-safe feature. There are several reasons for clearing. For one, due to some unlikely deterministic data pattern the integrator may get stuck at a large value and then never recover as a result of the switching of positions between the differentiator and the integrator. In some receivers such as FLEX or ReFLEX receivers, another reason for clearing is that sensitivity and simulcast performance may be optimized by simply altering the integration window dynamically based upon the data rate received. For this dynamic switching of integration lengths to operate correctly, both the integrator as well as the differentiator must be reset. The integrator must be reset because if window size X is changed to window size Y (where X>Y) without clearing it, the integrator will contain a DC component comprised of cross-correlation data from the previous X–Y samples that will never be cleared out. This would obviously cause erroneous results. Also, the differentiators should also be cleared when performing a integration length change to avoid using data from more than a symbol ago in the situation in which the new window size is smaller than the previous one.

The specified clearing scheme is performed by simply clearing the outputs of the integrator and differentiator RAMs rather than clearing each one of the RAM locations individually. One advantage of performing the clearing in this manner is obviously lower cost. Another advantage of clearing out the differentiator in this fashion is that when the integration length is dynamically changed from X to Y (where X>Y), the differentiator RAM will be already containing the desired data from Y samples ago immediately after the integration length change. Thus, the differentiator 304 will be immediately supplying correct data to the integrator 302 after such a window change without having to wait for the differentiator RAM (320) to fill up again. This results in a dynamic change of the integration window size without losing any incoming data samples.

Figure 6:
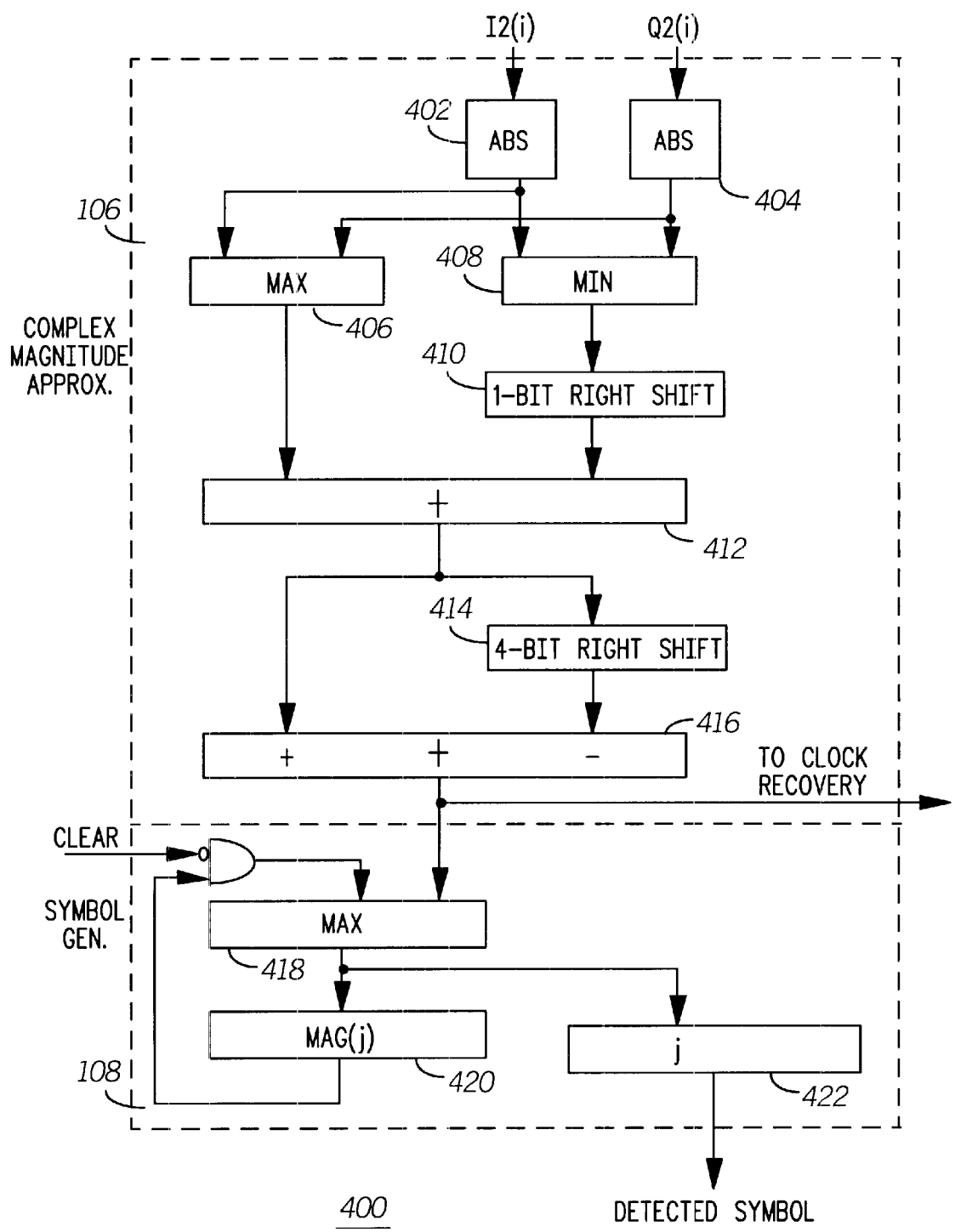
FIG. 6 is a block diagram of a complex magnitude approximater and a symbol generator in accordance with the present invention.

Referring to FIG. 6, a combined complex magnitude approximater and symbol generator element 400 is shown having a complex magnitude approximater element 106 and a symbol generator 108. In order to select the appropriate symbol, the magnitude of the cross-correlation energy must next be computed. This may be computed as:

$$\text{Magnitude}(I,Q) = \text{Square root}(I^2+Y^2)$$

with the square root calculation being optional since we are simply looking for the correlator path with the maximum magnitude to be able to make a symbol decision. However, it can become very costly and power consuming to perform the squaring operations since it involves costly multipliers. In addition, up to twice the input bit width may have to be preserved at the squaring unit's output to accommodate the desired dynamic range. The latter also increases the cost and current drain of the datapath located down stream. For these reasons, the following approximation is preferably used to minimize cost and current drain in our implementation of the complex magnitude calculation:

$$\text{Magnitude}(I, Q) = \text{Square root}(I^2+Y^2) = \frac{15}{16}\{\max(|I|,|Q|) + \frac{1}{2}(\min(|I|,|Q|))\}$$

This approximation has a very small average error rate and thus only negligible performance degradation can be found in simulation results under static, simulcast, and fading conditons by using this formula. FIG. 6 illustrates a hardware implementation of the indicated equation in a cost efficient manner. Note that the MAX and MIN blocks (406 and 408 respectively) in this diagram outputs the maximum and minimum of their operands, respectively. Also, the ABS block (402 and 404) generates the absolute value of the input operand. The computation of "max+min/2" of the absolute values of the input operands is quite straight forward as shown in FIG. 6. The "($15/16$)×(max+min/2)" approximation is generated by computing "(max+min/2)–($1/16$)×(max+min/2)" where the "$1/16$" multiplicative factor is evaluated by performing a 4-bit right shift (414) of the operand. Notice that the implementation of the above equation using simple add and subtraction blocks 412 and 416 in addition to the previously described blocks is several orders of magnitude less cost and less power when compared to a multiplication based approach involving squaring of terms.

On a sample by sample basis, if the magnitude of the current symbol is greater than the magnitude of another symbol for the same sample (or sampling instance), then the greater magnitude is stored in the "MAG(j)" register 420. In addition, the symbol corresponding to the value stored in the MAG(j) register is loaded in to the "j" register 422 as shown in FIG. 6. The detected symbol at the output of register 422 provides a correlator number for one of M correlators (correlator 0 through correlator 3 in an M=4 level system) at each of L sampling instances. In other words, the symbol stored in the latter register at the end of each L sampling instance is the detected symbol (correlator number) for that instance. Note that since we are simply searching for the symbol corresponding to the maximum cross-correlation magnitude detected for a single L sampling instance, it is not necessary to store all the magnitudes of each correlator for the L sampling instance. If the magnitudes of each correlator for each L sampling instance were required to be stored, it would take "2×N×M" registers where N is the number of samples in a symbol period. Thus, only using 2 registers as shown further reduces the cost and current drain.

The output of the complex magnitude approximater element 106 can further be used for clock recovery. In other words, the output of block 416 can provide by the end of each symbol period information sufficient to determine the particular L sampling instance (or phase) for each of the M correlators to aide in clock recovery. Specifically, at the end of a symbol period, the external clock recovery circuitry generates a pulse to capture the symbol corresponding to the maximum magnitude detected at the output of symbol generator (108).

Thus, in summary, a very low cost and low power hardware architecture of a correlation based demodulator amenable to a practical IC implementation has been presented. Many algorithmic and architectural schemes can be used to achieve this. Many design schemes were used to achieve minimal cost and power including some of the following techniques: Cross-correlation to one apriori known symbol at a time as opposed to all the symbols in a parallel manner; Trigonometric optimizations of the complex conjugate multiplications to reduce the number of multiplications needed by a factor of 2; Reduction in the number of bits used in the apriori known signals to 2 bits eliminates the need for ROM based lookup tables to generate these signals and also eliminates the need for costly multipliers to perform complex conjugate multiplications. A rectangular window boxcar filter was preferably used as the integration filter as opposed to using more costly windowing schemes where M is the number of FSK levels and L is the integration length. In addition, the positions of the integrator and differentiator were swapped in the boxcar filter to localize the bit width growth in only the integrator and not in the differentiator. The cost and size savings here was "2×M×L×$\log_2$L" bits. A resource shared RAM allowing for sequential addressing was used in the differentiators. Clearing of the differentiator and integrator was performed at the RAM outputs to minimize cost without losing any incoming data samples when the integration length was dynamically changed. A very low cost and low power approximation was used to perform the complex magnitude calculation without the need to use any multiplication or square root elements. Only 2 registers as opposed to "2×N×M" registers were used in the symbol generation process where N is the number of samples in a symbol period and M is the number of FSK symbols.

The above description is intended by way of example only and is not intended to limit the present invention in any way except as set forth in the following claims.

What is claimed is:

1. A serial implementation of a M-level correlation based demodulator, comprising:

a two's complement, pass-through, zero-out complex conjugate multiplier element providing a multiplier element output;

a boxcar filter coupled to the multiplier element output, wherein the boxcar filter comprises:

a differentiator coupled to and receiving the multiplier element output and providing a differentiator output, and an integrator coupled to and receiving the differentiator output and providing a boxcar filter output;

a complex magnitude approximater element coupled to and receiving the boxcar filter output and providing a complex magnitude approximater element output; and a maximum value and index holding element coupled to and receiving the complex magnitude approximater element output.

2. The correlation based demodulator of claim 1, wherein the multiplier element comprises hardware that reuses common products along an M-level of cross-correlation to reduce the required number of multiplication functions from 2M to M.

3. The correlation based demodulator of claim 1, wherein the boxcar filter integrates the multiplier element output over an L sample period by:

differentiating the multiplier element output using the differentiator to produce the differentiator output, and integrating the differentiator output by the integrator.

4. The correlation based demodulator of claim 1, wherein the complex magnitude approximater element obtains an approximation of the complex magnitude at the boxcar filter output without using multipliers.

5. The correlation based demodulator of claim 1, wherein the symbol generator uses a series of complex magnitude approximater element outputs to generate symbols from two registers.

6. A serial implementation of a M-level correlation based demodulator, comprising:

a two's complement pass-through zero-out complex conjugate multiplier element providing a multiplier element output;

a boxcar filter coupled to the multiplier element output, wherein the boxcar filter comprises:

a differentiator coupled to and receiving the multiplier element output and providing a differentiator output, and an integrator coupled to and receiving the differentiator output and providing a box car filter output;

a complex magnitude approximater element coupled to and receiving the boxcar filter output and providing a complex magnitude approximater element output; and a symbol generator coupled to and receiving the complex magnitude approximater element output.

7. A serial implementation of a M-level correlation based demodulator, comprising:

a two's complement pass-through zero-out complex conjugate multiplier element, wherein the complex conjugate multiplier element comprises a counter output which is decoded to generate a 2 bit wide Q term and also a 90 degree phase offset is created to generate a 2 bit-wide I term;

a boxcar filter coupled to the multiplier element;

a complex magnitude approximater element coupled to the boxcar filter; and a symbol generator.

8. A serial implementation of a M-level correlation based demodulator, comprising:

a two's complement pass-through zero-out complex conjugate multiplier element, wherein the complex conjugate multiplier element comprises a 3 stage tapped delay line coupled to a multiplexer to reduce the current drain by reducing a number of cycles required for the plus and minus frequency shift keying deviation operations of the complex conjugate multiplier;

a boxcar filter coupled to the multiplier element;

a complex magnitude approximater element coupled to the boxcar filter; and a symbol generator.

9. The demodulator of claim 6, wherein the symbol generator is a maximum value and further wherein the symbol generator includes an index holding element comprising two registers.

10. A serial implementation of a M-level correlation based demodulator, comprising:

a complex conjugate multiplier element providing a multiplier element output;

a boxcar filter coupled to the multiplier element output, wherein the boxcar filter comprises:
 a differentiator coupled to the multiplier element output for receiving an input and providing a differentiator output, and
 an integrator coupled to and receiving the differentiator output and for providing a boxcar filter output;

a complex magnitude approximater element coupled to and receiving the boxcar filter output and for providing a complex magnitude approximater element output; and a symbol generator coupled to and receiving the complex magnitude approximater element output.

11. The demodulator of claim 10, wherein the differentiator of the boxcar filter comprises a counter and a random access memory having a height of $2 \times M \times L$ words and a width of $B+2$ bits, wherein M represents the number of FM levels, L represents the correlator integration window length, and B represents the number of bits originally received by a demodulator.

12. The demodulator of claim 10, wherein the integrator of the boxcar filter comprises a counter and a random access member having a height of $2 \times M$ words and a width of $B+2$ bits+$\log_2 L$ bits, wherein M represents the number of FM levels, L represents the correlator integration window length, and B represents the number of bits originally received by a demodulator.

13. The demodulator of claim 10, wherein the symbol generator is a maximum value and further wherein the symbol generator includes an index holding element comprising two registers.

14. The demodulator of claim 11, wherein a clearing element at an output of the random access memory allows for dynamic switching of the correlator integration window length L.

15. A serial implementation of a M-level correlation based demodulator, comprising:

a complex conjugate multiplier element providing a multiplier element output;

a boxcar filter coupled to the multiplier element output, wherein the boxcar filter comprises:
 a differentiator coupled to and receiving the multiplier element output and providing a differentiator output, and
 an integrator coupled to and receiving the differentiator output and providing a boxcar filter output;

a complex magnitude approximater element coupled to and receiving the boxcar filter output wherein the approximater element approximates a complex magnitude of I and Q signals without multiplication elements and without square root elements to provide a complex magnitude approximater element output; and a maximum value and index holding element coupled to and receiving the complex magnitude approximater element output.

16. The demodulator of claim 15, wherein the maximum value and index holding element comprises 2 registers.

17. The demodulator of claim 15, wherein the boxcar filter receives an input at the differentiator and provides an output at the integrator.

18. The demodulator of claim 15, wherein the complex conjugate multiplier element comprises a two's complement, pass-through, zero-out complex conjugate multiplier element that reuses common products along an M-level of cross-correlation to reduce multiplication functions.

19. The demodulator of claim 15, wherein the approximater element performs a 15/16 multiplicative factor of the maximum of the absolute values of I and Q plus half of the minimum value of I and Q.

20. A serial implementation of a multiplierless M-level correlation based demodulator, comprising:

a complex conjugate element providing a complex conjugate element output;

a boxcar filter coupled to the complex conjugate element output, wherein the boxcar filter comprises:
 a differentiator coupled to and receiving the complex conjugate element output and providing a differentiator output, and
 an integrator coupled to and receiving the differentiator output and providing a boxcar filter output;

a complex magnitude approximater element coupled to and receiving the boxcar filter output and providing a complex magnitude approximater element output; and a symbol generator coupled to and receiving the complex magnitude approximater output.

21. A method of performing correlation detection of M-level frequency shift keyed signals I and Q in a serial fashion, comprising the steps of:

multiplying I and Q by the complex conjugate of an apriori known signal to provide a multiplied signal for each pair of I and Q samples at a rate of 2M faster than a sampling rate at a demodulator input;

integrate the multiplied signal over a desired integration window L to provide an integrated signal for each pair of I and Q samples at a rate of 2M by:
 differentiating the multiplied signal to provide a differentiated multiplied signal, and
 integrating the differentiated multiplied signal to provide the integrated signal;

compute the magnitude of the integrated signal for each pair of I and Q samples at a rate of M time faster than the sampling rate; and select as a detected symbol, a symbol corresponding to the integrated signal having the highest magnitude at each sampling instance at a rate M times faster than the sampling rate.

* * * * *